United States Patent [19]

Conte

[11] 4,266,330
[45] May 12, 1981

[54] SECUREMENT OF COUPLINGS TO LENGTHS OF HOSE

[76] Inventor: Laurino Conte, 2 Gladhall Ave., Thornbury, Victoria, Australia

[21] Appl. No.: 954,280

[22] Filed: Oct. 24, 1978

[30] Foreign Application Priority Data

Oct. 28, 1977 [AU] Australia ............................ PD2230

[51] Int. Cl.³ ........................................... B23P 19/04
[52] U.S. Cl. ........................................ 29/267; 29/282
[58] Field of Search ..................... 29/267, 282, 281.1, 29/237; 269/88, 45, 152; 248/224.3

[56] References Cited

U.S. PATENT DOCUMENTS

| 877,306 | 1/1908 | Dinsmoor | 269/152 |
|---|---|---|---|
| 1,204,028 | 11/1916 | Johnson | 29/267 |
| 1,416,201 | 5/1922 | Haynes | 248/224.3 |
| 2,794,356 | 6/1957 | Roberson | 269/129 |
| 3,245,289 | 4/1966 | Nelson | 269/268 |
| 3,743,566 | 7/1973 | Louthan et al. | 269/45 |

Primary Examiner—James L. Jones, Jr.
Attorney, Agent, or Firm—Ladas & Parry

[57] ABSTRACT

Apparatus for aiding the mounting of end-fittings to hoses includes a pair of adjustable clamps, one for the hose and the other for the end-fitting, attached to a support. A post carried by the support carries in turn a lever-actuated press head disposed to force an end-fitting onto a hose held in the hose clamp. Also disclosed and claimed is an assembly including respective hose and fitting clamps and a support therefor.

21 Claims, 3 Drawing Figures

SECUREMENT OF COUPLINGS TO LENGTHS OF HOSE

This invention relates to the renewal of failed hose lines such as the hydraulic hoses of industrial and farming machinery.

Failure of hydraulic hoses in the field will generally entail the mounting anew of end-fittings or couplings to a fresh or residual length of hose. Typical hydraulic hose consists of an outer rubber layer surrounding a mesh reinforced braid core. A standard two-part end-fitting includes an outer ferrule pressed and threaded about the core and an insert forced and threaded into the interior of the core. The end pressure and threading forces required to properly make these connections are substantial and it is the usual practice to either send the troubled machinery away for repair or to await the arrival of a properly equipped serviceman. The consequent loss of machine time is considerable and it is accordingly an object of the invention to provide a unit which renders feasible the repair or renewal of hoses in the field.

The invention provides, in one aspect, apparatus for aiding the mounting of end-fittings to hoses comprising:

respective first and second adjustable clamp means mounted on a common support, which first clamp means defines opposed arcuate edges or faces between which a length of hose may be clamped while the second clamp means defines opposed straight edges or faces between which parallel side edges of a rigid object may be clamped;

a post demountably or fixedly carried by said support;

a press head slidably disposed relative to said post and having a press face overlying said first clamp means; and a lever assembly supported by said post for moving the press head towards the first clamp means for forcing an end-fitting, or part thereof, onto the end of a hose held in the first clamp means.

The apparatus is especially adaptable to the application of a two part end fitting of the type described above. It is so used by first holding the hose in the first clamp means and then using the lever assembly to push the ferrule of the end-fitting about the braided core of the hose. With the hose still held, a wrench is used to rotate the ferrule (which carries an external hexagonal formation and an internal screw thread) and so additionally thread the ferrule onto the core. The insert can now be similarly pressed into the core. Once this is effected, the hose clamp is released and the hexagonal formation of the ferrule held in the second clamp means for subsequent wrench effected rotation of the insert to likewise thread it fully into the core. The necessity to change clamps arises because if only the hose and not the ferrule is clamped during threading of the insert, the partially completed fitting will tend to unwind.

The press head is advantageously spring loaded so as to cushion the force applied against the parts of the end-fitting by the lever assembly.

The respective clamp means may be disposed on adjacent sides of a generally rectangular plate forming the support.

For compactness, the lever assembly preferably comprises a single elongate lever pivoted to said post while one or both of the clamp means is advantageously pivoted to the supporting plate to allow it to be folded back towards the plate.

In a further aspect, the invention also provides a clamp assembly comprising, a support, and respective first and second adjustable clamp means mounted at spaced locations on said support, which first clamp means defines opposed arcuate edges or faces between which a length of hose may be clamped while the second clamp means defines opposed straight edges or faces between which parallel side edges of a rigid object may be clamped.

The invention will now be described by way of example with reference to the accompanying drawings, in which.

Figure 1:
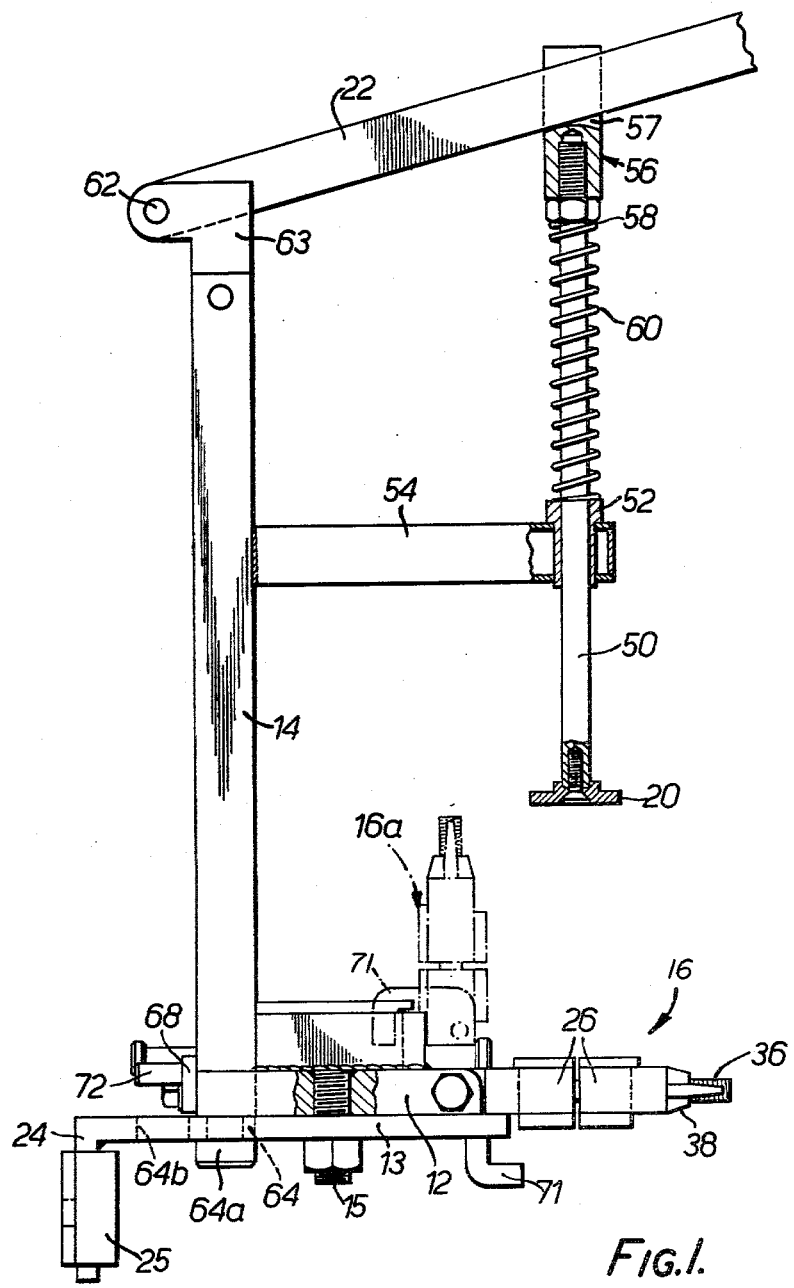
FIG. 1 is a side elevation of apparatus constructed in accordance with the invention.
Figure 2:
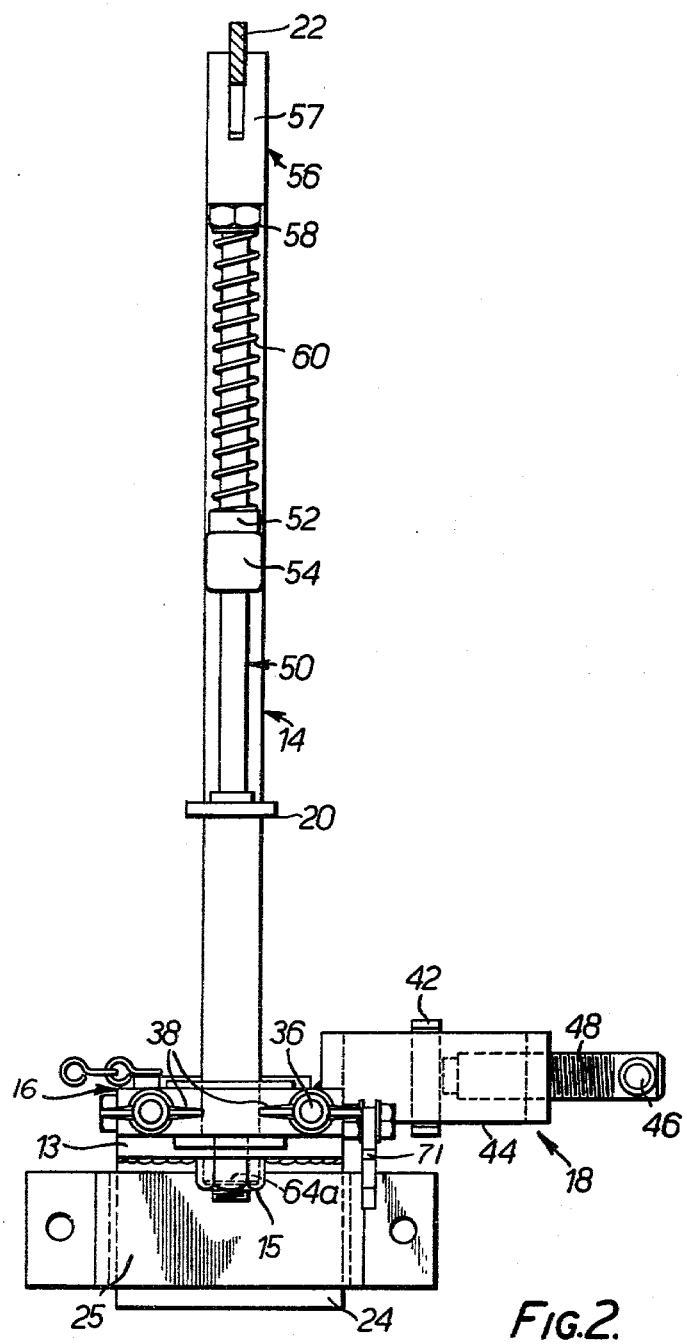
FIG. 2 is a front elevational view of the apparatus of FIG. 1.

The illustrated apparatus 10 is intended to serve as part of the inboard tool kit of a tractor and to this end is in part collapsible, in part dismantleable. In essence, the apparatus includes a generally rectangular support plate 12 which at one end demountably carries an upright post 14. At the other end and at one side, plate 12 fixedly supports a pair of clamp mechanisms 16, 18. Post 14 in turn supports a vertically acting spring loaded press head 20 which overlies clamp mechanism 16, and is associated with a lever assembly including lever 22 for forcing head 20 downwardly.

In the context of the invention, reference to head 20 overlying clamp mechanism 16 is not intended to be limited to the case where one is strictly above the other. As will be apparent the term implies merely that the head can press against an object held in the clamp mechanism.

Support plate 12 is disengagably coupled to a second underlying plate 13 by a bolt fastener 15. Plate 13 is in turn provided at one end, the end which on correct assembly of the plates is opposite clamp mechanism 16, with a depending portion 24 which can be slotted into an appropriate bracket fitting 25 on the tractor frame.

Clamp mechanism 16 is intended to securely support a length of hose and to this end comprises a vice made up of a pair of rectangular blocks 26. Blocks 26 have respective opposed semi-circular grooves 28 which cooperate to define an opening 30 in which the hose may be clamped. One block is stationary and carries an integral hinge lug 32 by which the vice is pivoted on a transverse pin extending between corresponding hinge lugs 34 on the support plate 12. The other of the blocks 26 is arranged for free travel on a pair of screw threaded rods 36 which project from the fixed block and carry respective wing nuts 38 by which the travelling block may be brought towards the stationary block.

The other clamp mechanism 18 is intended to retain the hexagonal formation of the ferrule of a two-part end fitting as the insert is screwed into place. For this purpose, clamp mechanism 18 comprises a conventional T-vice affording opposed straight faces, between which the ferrule is received. One of these faces is provided by an edge of support plate 12 and the other by a travelling jaw 42 slidably supported between the two side arms of a U-shaped frame piece 44 rigidly secured to plate 12. Movement of jaw 42 is effected by rotation of a handle 46 incorporating shaft 48 screw threadingly supported in the base of frame piece 44.

Referring in particular to FIG. 1, press head 20 consists of a circular plate rotatably and coaxially mounted to the bottom end of a vertical rod 50. Rod 50 is slidable in a bush bearing 52 seated in the outer end of an arm 54 which projects rigidly from post 14. The upper end of rod 50 carries an enlarged head 56 affording both an upwardly open yoke 57 for releasably receiving lever 22 and an underside shoulder 58. A helical compression spring 60 is mounted about the rod between shoulder 58 and bush 52 so that a force applied to lever 22 to bring the press head downwardly is cushioned by the spring 60.

Lever 22 is pivoted to post 14 by being carried on a pin 62 supported in a segment 63 which projects from the post on the side opposite to rod 50, the arrangement being such that the lever can be turned over the top of the post through about 250° to bring it to a depending storage position against the post.

Figure 3:
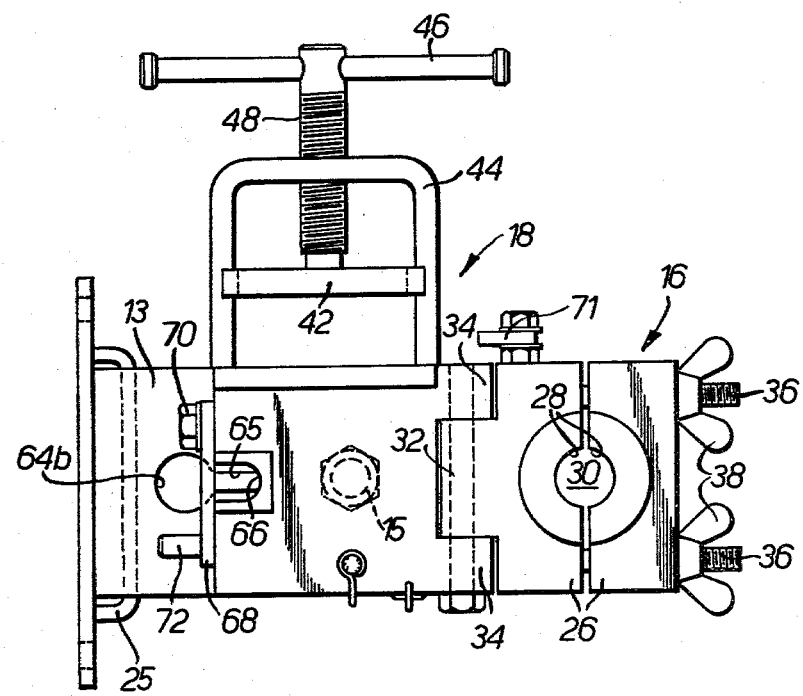
FIG. 3 is a plan view of the apparatus with the post and clamp assembly removed.

As mentioned, post 14 is demountably attached to support plate 12. This is achieved by providing the otherwise square-section post 14 with an annular groove 64 at a position separated by a short rounded stub portion 64a from the lower end of the post and by keying the post just above the groove with the rim of a complementary marginal recess 66 in plate 12. This engagement is achieved by bringing stub portion 64a through a matching opening 64b in plate 13 and sliding grooved portion 64 into a close fitting slot 65 (FIG. 3) which is contiguous with opening 64b and underlies recess 66. The post is retained in place by a keeper bar 68 which carries a finger grip pin 72 for easy rotation of the bar to the position illustrated in the drawings in which recess 66 is closed off and the post tightly confined in the recess.

The operation of the illustrated apparatus is foreshadowed above but will now be set out again briefly. To commence, post 14 is detached and vice 16 is rotated about hinge 32, 34 to the vertical position indicated by ghost lines 16a in FIG. 1 and held in place by engagement of a hook 71 pivoted on vice 16 with frame piece 44 of vice 18. The hose to be repaired or renewed is inserted into vice 16 through opening 30 (from the left in FIG. 1) and securely clamped. The complete assembly is rotated about fastener 15 through 45° to facilitate cutting of the hose and locked by means of a chain and pin (not shown).

Once the hose has been cut, vice 16 is relaxed and the hose pushed through about 3". The vice is tightened only to an extent allowing the hose to be rotated by hand. The hose is then stripped of its outer covering to expose the braid core for the required distance back from the end of the hose. Hook 71 is now disengaged and the vice returned to its horizontal position; the hose is removed and re-inserted from underneath. Post 14 is assembled with plate 12 and secured in position with keeper 68. The ferrule part of the end fitting is brought about the braid and pressed firmly thereon by using lever 22 to bring the press head 20 down on to the top of the ferrule. While maintaining pressure, a suitable wrench is applied to the hexagonal formation of the ferrule to rotate the ferrule and gradually screw it down onto the braid. The free pivotal mounting of the plate comprising the press head allows this plate to turn with the ferrule as pressure is maintained.

Once the ferrule is correctly in place on the hose, lever pressure is released and the insert part of the end fitting introduced into the braid within the ferrule. Pressure is again applied by depressing the lever to force the insert further in to the hose, ensuring that the threads of the fitting are engaged. It is now appropriate to apply the wrench to the hexagonal formation on the insert but with only the hose supported in the vice a good end fitting will not result. Accordingly, the hose is released from the vice 16 and the assembly retained instead of vice 18 by clamping the hexagonal formation of the ferrule in this vice. Since considerable effort is required to now rotate the insert fully into position, maximum freedom of movement is desirable. Hence, prior to commencing the final operation, the press assembly is removed by disengaging post 14 from its supporting recess 16.

Once the whole task has been completed, further compactness for storage can be achieved by separating the plates 12, 13 and by turning vice 16 vertically; as mentioned, this position can be retained by engaging hook 71 with frame piece 44 of vice 18.

It will be appreciated that the invention provides a readily assembled and disassembled apparatus for applying an end fitting to a failed hydraulic hose in the field. The user of hydraulically powered equipment, such as the farmer with his tractor, can carry parts of the apparatus with him, readily assembly the unit immediately failure occurs and carry out prompt repairs. In contrast to prior practice, he need no longer take the failed items to a repair station with the consequent loss of both his own time and machine time.

I claim:

1. Apparatus for mounting an end-fitting on a hose comprising:

respective first and second adjustable clamp assemblies carried by a support plate at spaced apart positions along the periphery thereof, which first clamp assembly defines opposed arcuate edges or faces defining an adjustable opening outwardly of the plate in which a length of hose may be clamped for application of an end-fitting thereto, while the second clamp assembly defines opposed straight edges or faces between which parallel side edges of a first part of the end-fitting may be thereafter clamped to facilitate tightening of a second part of the end-fitting onto the length of hose;

a post demountably or fixedly carried by said support plate;

a press head moveably disposed relative to said post and having a press face overlying said adjustable opening of the first clamp assembly; and a lever assembly supported by said post for moving the press head towards said opening for forcing the end-fitting, or part thereof, onto the end of the hose held in the opening.

2. Apparatus according to claim 1 wherein the press head is a pad rotatably affixed to a rod which is slidably carried by an arm projecting from the post.

3. Apparatus according to claim 1 or 2 wherein said post is demountably carried by said support plate by releasable irrotational keying of a lower portion thereof in a marginal recess in said support plate.

4. Apparatus according to claim 3 including a keeper bar pivotably carried by said support plate which bar is rotatable to a position in which it retains the post in said marginal recess.

5. Apparatus according to claim 1 wherein said support plate is a generally rectangular plate and the respective clamp assemblies are disposed on adjacent sides thereof.

6. Apparatus according to claim 1 or 2 wherein said first clamp assembly is pivotably mounted to said support plate whereby it may be folded back towards the support plate to alter the plane of said opening by about 90°.

7. Apparatus according to claim 1 or 2 wherein the first adjustable clamp assembly comprises a pair of rods, and a pair of blocks having opposed recesses which afford said arcuate edges or faces, one of the blocks being fixed to the rods while the other is slidable thereon to permit adjustment of the opening defined by said arcuate edges or faces.

8. Apparatus according to claim 7 wherein the second adjustable clamp assembly includes a frame, and a jaw moveable in said frame towards and away from an opposed edge of said plate, the edge of the plate and the jaw thereby affording said straight edges or faces of the second clamp assembly.

9. Apparatus according to claim 1 including means to detachably mount the support plate to a separate slotted bracket fitting.

10. Apparatus according to claim 9 wherein said means comprises a further plate pivotably and disengageably mounted to said support plate, which further plate includes a depending portion for receipt in a complementary slotted bracket fitting.

11. Apparatus according to claim 1 or 2 wherein the press head is spring loaded so as to cushion the force applied against the parts of the end-fitting by the lever assembly.

12. Apparatus according to claim 11 wherein the lever assembly comprises a single elongate lever pivoted to said post.

13. Apparatus for mounting an end-fitting on a hose comprising:
    a support plate formed with a marginal recess,
    an adjustable clamp assembly carried by the support plate which clamp assembly defines opposed arcuate edges or faces defining an adjustable opening outwardly of the plate in which a length of hose may be clamped for application of an end-fitting thereto,
    a post demountably carried by said support plate by releasable irrotational keying of a lower portion thereof in said marginal recess,
    a keeper bar pivotably carried by said support plate, which bar is rotatable to a position in which it retains the post in said marginal recess,
    a press head moveably disposed relative to said post and having a press face overlying said adjustable opening of the first clamp assembly, and
    a lever assembly supported by said post for moving the press head towards said opening for forcing the end-fitting, or part thereof, onto the end of the hose held in the opening.

14. Apparatus according to claim 13 wherein the press head is a pad rotatably affixed to a rod which is slidably carried by an arm projecting from the post.

15. Apparatus according to claim 13 or 14 wherein the press head is spring loaded so as to cushion the force applied against the parts of the end-fitting by the lever assembly.

16. Apparatus according to claim 15 wherein the lever assembly comprises a single elongate lever pivoted to said post.

17. Apparatus according to claim 13 or 14 wherein said clamp assembly is pivotably mounted on said support plate whereby it may be folded back towards the plate to alter the plane of said opening by about 90 degrees.

18. Apparatus according to claim 13 or 14 wherein the adjustable clamp assembly comprises a pair of rods, and a pair of blocks having opposed recesses which afford said arcuate edges or faces, one of the blocks being fixed to the rods while the other is slidable thereon to permit adjustment of the opening defined by said arcuate edges or faces.

19. Apparatus according to claim 13 including means to detachably mount the support plate to a separate slotted bracket fitting.

20. Apparatus according to claim 19 wherein said means comprises a further plate pivotably and disengageably mounted to said support plate, which further plate includes a depending portion for receipt in a complementary slotted bracket fitting.

21. Apparatus according to claim 1, wherein the second adjustable clamp assembly includes a frame, and a jaw movable in said frame towards and away from an opposed edge of said support plate, the edge of the support plate and the jaw thereby affording said straight edges or faces of the second clamp assembly.

* * * * *